(12) United States Patent
Akahane

(10) Patent No.: US 10,097,802 B2
(45) Date of Patent: Oct. 9, 2018

(54) IMAGE PROCESSING TECHNIQUE FOR REDUCING MOIRE

(71) Applicant: CANON KABUSHIKI KAISHA, Tokyo (JP)

(72) Inventor: Takashi Akahane, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 15/189,329

(22) Filed: Jun. 22, 2016

(65) Prior Publication Data

US 2016/0381336 A1    Dec. 29, 2016

(30) Foreign Application Priority Data

Jun. 29, 2015  (JP) ................. 2015-130326

(51) Int. Cl.
| | |
|---|---|
| *H04N 9/64* | (2006.01) |
| *H04N 5/21* | (2006.01) |
| *H04N 5/265* | (2006.01) |
| *H04N 5/357* | (2011.01) |
| *H04N 9/083* | (2006.01) |

(52) U.S. Cl.
CPC ............. *H04N 9/646* (2013.01); *H04N 5/21* (2013.01); *H04N 5/265* (2013.01); *H04N 5/3572* (2013.01); *H04N 9/083* (2013.01)

(58) Field of Classification Search
CPC .......... H04N 9/646; H04N 9/083; H04N 5/21; H04N 5/265; H04N 5/3572
See application file for complete search history.

(56) References Cited

U.S. PATENT DOCUMENTS

| | | | | |
|---|---|---|---|---|
| 4,542,403 A | * | 9/1985 | Zimmermann | ...... H04N 5/2352 348/229.1 |
| 5,231,677 A | | 7/1993 | Mita et al. | |

(Continued)

FOREIGN PATENT DOCUMENTS

| | | |
|---|---|---|
| CN | 1835565 A | 9/2006 |
| CN | 101907815 A | 12/2010 |

(Continued)

OTHER PUBLICATIONS

Extended European Search Report dated Nov. 2, 2016, in European Patent Application No. 16174344.8.

(Continued)

*Primary Examiner* — Antoinette Spinks
(74) *Attorney, Agent, or Firm* — Fitzpatrick, Cella, Harper & Scinto

(57) ABSTRACT

There is provided an image processing apparatus. A calculation unit calculates a difference in a signal level, for each area, between a first image obtained by shooting a subject under a first shooting condition and a second image obtained by shooting the subject under a second shooting condition in which high-frequency components of an optical image of the subject are reduced compared to the first shooting condition. A mixing unit mixes a signal level of the first image and a signal level of the second image at a ratio based on the difference, so as to generate a third image. The mixing unit sets a ratio of the second image when the difference is a first value, to be larger than a ratio of the second image when the difference is a second value that is smaller than the first value.

14 Claims, 14 Drawing Sheets

(56) References Cited

U.S. PATENT DOCUMENTS

| | | | | |
|---|---|---|---|---|
| 5,574,510 | A * | 11/1996 | Abe | H04N 5/265 348/584 |
| 6,201,582 | B1 * | 3/2001 | Hentschel | H04N 5/21 348/607 |
| 6,421,087 | B1 | 7/2002 | Ikeda | |
| 7,609,298 | B2 | 10/2009 | Ikeda | |
| 8,164,646 | B2 | 4/2012 | Ikeda | |
| 8,264,592 | B2 | 9/2012 | Inoue | |
| 8,754,957 | B2 * | 6/2014 | Kano | H04N 5/3572 348/179 |
| 8,773,574 | B2 | 7/2014 | Inoue | |
| 9,706,192 | B2 * | 7/2017 | Watanabe | G02B 27/2214 |
| 9,877,004 | B2 * | 1/2018 | Sawadaishi | H04N 9/646 |
| 9,973,687 | B2 * | 5/2018 | Huang | H04N 5/23216 |
| 2002/0008920 | A1 * | 1/2002 | Mihara | G02B 15/177 359/684 |
| 2006/0244841 | A1 | 11/2006 | Ikeda | |
| 2009/0185755 | A1 * | 7/2009 | Cho | H04N 5/23248 382/264 |
| 2009/0284614 | A1 | 11/2009 | Ikeda | |
| 2010/0309365 | A1 | 12/2010 | Inoue | |
| 2012/0287330 | A1 | 11/2012 | Inoue | |
| 2013/0222531 | A1 * | 8/2013 | Hirai | H04N 1/58 348/32 |
| 2014/0001589 | A1 * | 1/2014 | Fukuda | H01L 27/14623 257/432 |

FOREIGN PATENT DOCUMENTS

| | | |
|---|---|---|
| JP | 10-248068 A | 9/1998 |
| JP | 2013-051524 A | 3/2013 |

OTHER PUBLICATIONS

Mansurov, "How to Avoid Moire", Photographylife.com, Feb. 10, 2012.

Jun. 5, 2018 Chinese Official Action in Chinese Patent Appln. No. 201610470757.6.

* cited by examiner

IMAGE PROCESSING TECHNIQUE FOR REDUCING MOIRE

BACKGROUND OF THE INVENTION

Field of the Invention

The present invention relates to an image processing apparatus, an image capturing apparatus, an image processing method, an image capturing method, and a storage medium.

Description of the Related Art

When a subject image having a spatial frequency that is higher than one half of a sampling frequency N is captured by an image capturing apparatus, folding distortion (moire) will generally occur in the captured image as per the Nyquist theorem. As a measure taken to prevent moire, an optical low-pass filter for cutting off frequencies higher than N/2 is arranged on an image capturing surface of an image sensor.

However, there is a limit to steepening the cut-off characteristics of the optical low-pass filter, and thus frequencies lower than N/2 are also attenuated. Accordingly, usage of the optical low-pass filter involves the disadvantage of the resolution of the entire screen being reduced, and it is not possible to obtain an image with high image quality that corresponds to the original number of pixels of the image sensor. For example, in a scene like a natural landscape in which there is no regular artificial objects, large moire is not likely to occur, and thus the disadvantage of the reduction in resolution may outweigh the advantage of moire prevention (reduction). In recent years, therefore, a large number of cameras that are not provided with an optical low-pass filter have appeared on the market. In such a case, there is a possibility of large moire occurring depending on the scene, and thus a technique for reducing moire as needed at image capture is proposed.

For example, a technique in which an aperture value for shooting is increased to cause a diffraction phenomenon, and frequencies higher than N/2 are attenuated before reaching an image sensor is known as an ordinary shooting technique of a camera. FIG. 4 is a diagram illustrating diffraction limit curves, and its horizontal axis represents the spatial frequency and its vertical axis represents the modulation transfer function (MTF). As shown in FIG. 4, the cutoff frequency shifts to the lower frequency side the more the F number increases, and it is thus possible to reduce moire by increasing the aperture value. However, increasing the aperture value will reduce the resolution of the entire screen to the same extent or more as in the case where an optical low-pass filter is used.

In order to prevent such a situation, Japanese Patent Laid-Open No. 10-248068 proposes a technique in which luminance signals are generated based on an image captured in an in-focus state, and color signals are generated based on an image that was captured in a state of being defocused by a predetermined amount from the in-focus state. According to this technique, it is possible to obtain a high-definition image in which color moire is suppressed. However, the color resolution of the entire screen is likely to be reduced. Furthermore, another subject may be in focus in the defocused state, and color moire may occur in another region different from the originally focused region.

Ordinarily, moire occurs in a region in which there is a subject with a high spatial frequency, and thus it is not necessarily the case that large moire occurs in the entire screen. However, the conventional techniques for reducing moire may also reduce the resolution of the entire screen including a region with small moire.

SUMMARY OF THE INVENTION

The present invention was made in view of such circumstances, and provides a technique for reducing moire while suppressing a reduction in resolution.

According to a first aspect of the present invention, there is provided an image processing apparatus comprising: a calculation unit configured to calculate a difference in a signal level, for each area, between a first image obtained by shooting a subject under a first shooting condition and a second image obtained by shooting the subject under a second shooting condition in which high-frequency components of an optical image of the subject are reduced compared to the first shooting condition; and a mixing unit configured to mix a signal level of the first image and a signal level of the second image at a ratio based on the difference, so as to generate a third image, wherein the mixing unit sets a ratio of the second image to be mixed into the third image when the difference is a first value, to be larger than a ratio of the second image to be mixed into the third image when the difference is a second value that is smaller than the first value.

According to a second aspect of the present invention, there is provided an image capturing apparatus comprising: a generation unit configured to generate a first image by shooting a subject under a first shooting condition, and generate a second image by shooting the subject under a second shooting condition in which high-frequency components of an optical image of the subject are reduced compared to the first shooting condition; a calculation unit configured to calculate a difference in a signal level, for each area, between the first image and the second image; and a mixing unit configured to mix a signal level of the first image and a signal level of the second image at a ratio based on the difference, so as to generate a third image, wherein the mixing unit sets a ratio of the second image to be mixed into the third image when the difference is a first value, to be larger than a ratio of the second image to be mixed into the third image when the difference is a second value that is smaller than the first value.

According to a third aspect of the present invention, there is provided an image processing method executed by an image processing apparatus, comprising: calculating a difference in a signal level, for each area, between a first image obtained by shooting a subject under a first shooting condition and a second image obtained by shooting the subject under a second shooting condition in which high-frequency components of an optical image of the subject are reduced compared to the first shooting condition; and mixing a signal level of the first image and a signal level of the second image at a ratio based on the difference, so as to generate a third image, wherein the mixing sets a ratio of the second image to be mixed into the third image when the difference is a first value, to be larger than a ratio of the second image to be mixed into the third image when the difference is a second value that is smaller than the first value.

According to a fourth aspect of the present invention, there is provided an image capturing method executed by an image capturing apparatus, comprising: generating a first image by shooting a subject under a first shooting condition, and generating a second image by shooting the subject under a second shooting condition in which high-frequency components of an optical image of the subject are reduced compared to the first shooting condition; calculating a difference in a signal level, for each area, between the first image and the second image; and mixing a signal level of the first image and a signal level of the second image at a ratio based on the difference, so as to generate a third image, wherein the mixing sets a ratio of the second image to be mixed into the third image when the difference is a first value, to be larger than a ratio of the second image to be mixed into the third image when the difference is a second value that is smaller than the first value.

According to a fifth aspect of the present invention, there is provided a non-transitory computer-readable storage medium which stores a program for causing a computer to execute an image processing method comprising: calculating a difference in a signal level, for each area, between a first image obtained by shooting a subject under a first shooting condition and a second image obtained by shooting the subject under a second shooting condition in which high-frequency components of an optical image of the subject are reduced compared to the first shooting condition; and mixing a signal level of the first image and a signal level of the second image at a ratio based on the difference, so as to generate a third image, wherein the mixing sets a ratio of the second image to be mixed into the third image when the difference is a first value, to be larger than a ratio of the second image to be mixed into the third image when the difference is a second value that is smaller than the first value.

According to a sixth aspect of the present invention, there is provided a non-transitory computer-readable storage medium which stores a program for causing a computer to execute an image capturing method comprising: generating a first image by shooting a subject under a first shooting condition, and generating a second image by shooting the subject under a second shooting condition in which high-frequency components of an optical image of the subject are reduced compared to the first shooting condition; calculating a difference in a signal level, for each area, between the first image and the second image; and mixing a signal level of the first image and a signal level of the second image at a ratio based on the difference, so as to generate a third image, wherein the mixing sets a ratio of the second image to be mixed into the third image when the difference is a first value, to be larger than a ratio of the second image to be mixed into the third image when the difference is a second value that is smaller than the first value.

Further features of the present invention will become apparent from the following description of exemplary embodiments with reference to the attached drawings.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

Summary of Moire Reduction Processing

Figure 1:
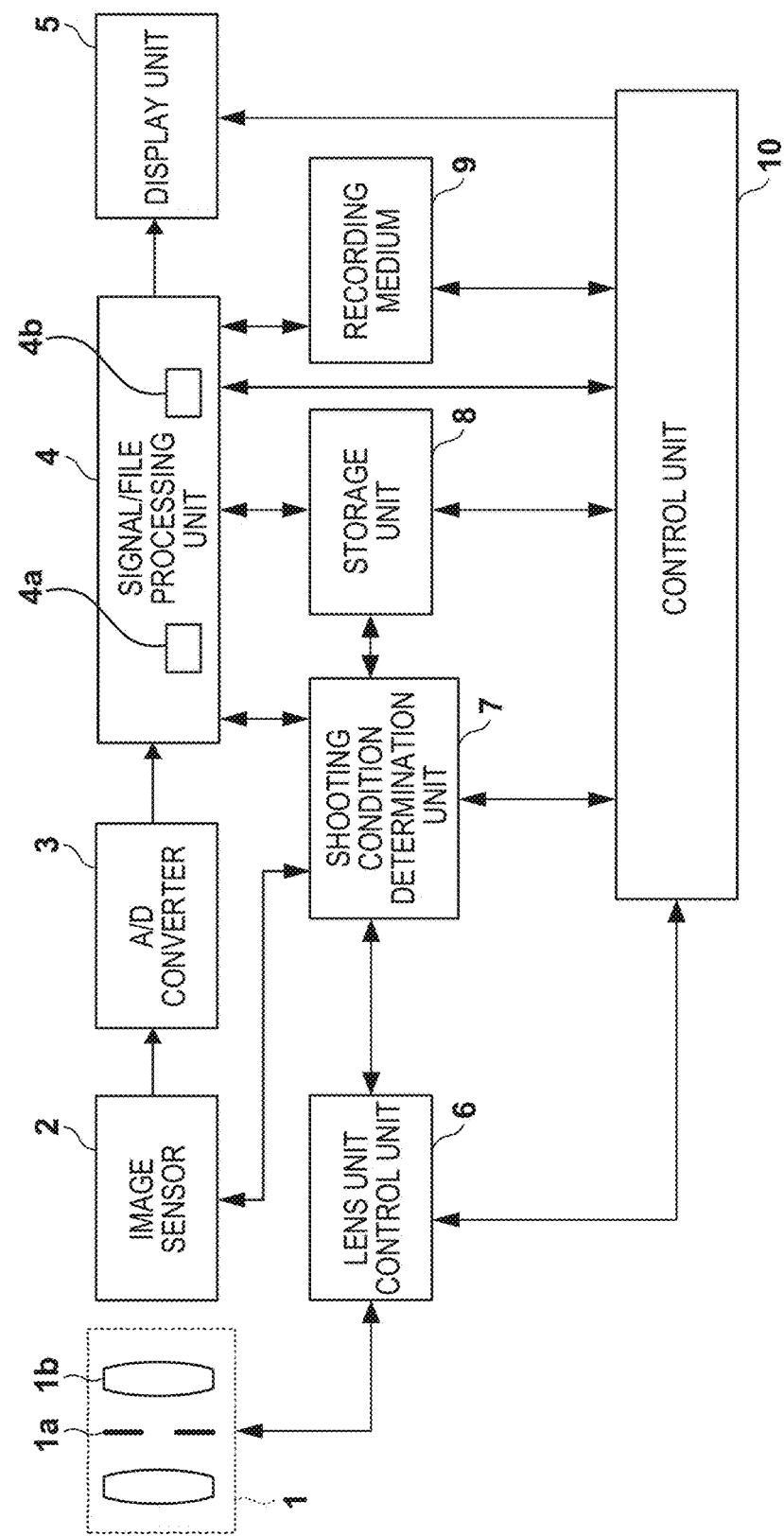
FIG. 1 is a block diagram illustrating a basic configuration of an image capturing apparatus 100.

FIG. 1 is a block diagram illustrating a basic configuration of an image capturing apparatus 100 according to a first embodiment. The image capturing apparatus 100 performs shooting of a subject under normal shooting conditions (main shooting) as well as shooting of the same subject under shooting conditions with an aperture value greater than that of the normal shooting conditions (small-aperture shooting), in order to reduce moire. Hereinafter, an image generated by the main shooting is referred to as "main image", and an image generated by the small-aperture shooting is referred to as "small-aperture image".

Here, "shooting conditions" include, for example, aperture value, shutter speed, ISO sensitivity, focal length, focus lens position, shooting distance, and the like. If a lens unit 1 is configured to be detachable with respect to the main body of the image capturing apparatus 100 (camera main body), "shooting conditions" also include lens ID and camera ID. Furthermore, "normal shooting conditions" mean the shooting conditions that are ordinarily considered to be suitable for a user to acquire the intended image. For example, "normal shooting conditions" may be shooting conditions that are manually set by the user, or shooting conditions that are automatically set according to the scene to be shot or the like by the image capturing apparatus 100.

The small-aperture image may have a resolution lower than that of the main image due to the influence of a diffraction phenomenon caused by the aperture. Instead, the small-aperture image can be expected to have small moire in a region that corresponds to the region of the main image in which large moire might occur. Accordingly, the image capturing apparatus 100 mixes the main image and the small-aperture image so that the ratio of the main image is large in a region with small moire, and the ratio of the small-aperture image is larger in a region with large moire. Accordingly, it is possible to generate an image in which moire is reduced while suppressing a reduction in the resolution.

Note that the present embodiment is described, taking a small-aperture image as an example of an image (second image) that is to be mixed with a main image (first image), but the image to be mixed with the main image is not limited to the small-aperture image. Any image can achieve the same effect as with the small-aperture image as long as it is an image that is generated by performing shooting under shooting conditions (second shooting conditions) in which moire is to be reduced compared to the normal shooting conditions (first shooting conditions). For example, the image capturing apparatus 100 may generate, instead of the small-aperture image, an image (blurred image) that is more blurred than the main image. The blurred image can be generated by performing shooting under shooting conditions in which a subject is defocused compared to the normal shooting conditions (that is, shooting conditions in which a subject is not in focus). Alternatively, a case is conceivable in which the image capturing apparatus 100 is provided with a mechanism (not shown) for adding and removing an optical low-pass filter to and from the image capturing surface of an image sensor 2. In this case, the image capturing apparatus 100 generates the main image under a shooting condition in which the optical low-pass filter has been removed (that is, a shooting condition in which the optical low-pass filter is not arranged on a light path leading to the image sensor 2). Also, the image capturing apparatus 100 generates an image (filter image) that serves as the image to be mixed with the main image under a shooting condition in which the optical low-pass filter has been added (that is, a shooting condition in which the optical low-pass filter is arranged on the light path leading to the image sensor 2).

The small-aperture image, the blurred image, and the filter image are images that are all generated by shooting a subject under a shooting condition in which high-frequency components of an optical image of the subject formed on the image sensor 2 are reduced compared to the normal shooting condition. Accordingly, these images are expected to have small moire although they have a resolution lower than that of the main image.

Basic Configuration of Image Capturing Apparatus 100

As shown in FIG. 1, the image capturing apparatus 100 is provided with the lens unit 1 and the image sensor 2. When shooting is performed using the image capturing apparatus 100, an image capturing optical system of the lens unit 1 forms an image of light of a subject on the image sensor 2. The lens unit 1 includes an aperture 1a and a focus lens 1b. A lens unit control unit 6 performs control of the lens unit 1 and data communication. Specifically, the lens unit control unit 6 controls the aperture size of the aperture 1a based on the shooting state setting with an F number. Furthermore, the lens unit control unit 6 controls the position of the focus lens 1b based on autofocus (AF) or manual focus, in order to perform focus adjustment according to the distance of the subject.

A shooting condition determination unit 7 acquires shooting conditions for the main shooting, such as focal length, shooting distance, and aperture value of the image capturing optical system, through the lens unit control unit 6. Furthermore, the shooting condition determination unit 7 determines shooting conditions for the small-aperture shooting in which a diffraction phenomenon occurs.

The image sensor 2 converts the formed image light into electric signals. An A/D converter 3 converts the electric signals obtained from the image sensor 2 into digital image signals, and outputs the resultant signals to a signal/file processing unit 4. The signal/file processing unit 4 includes a signal processing unit 4a and an image file processing unit 4b.

Figure 2:
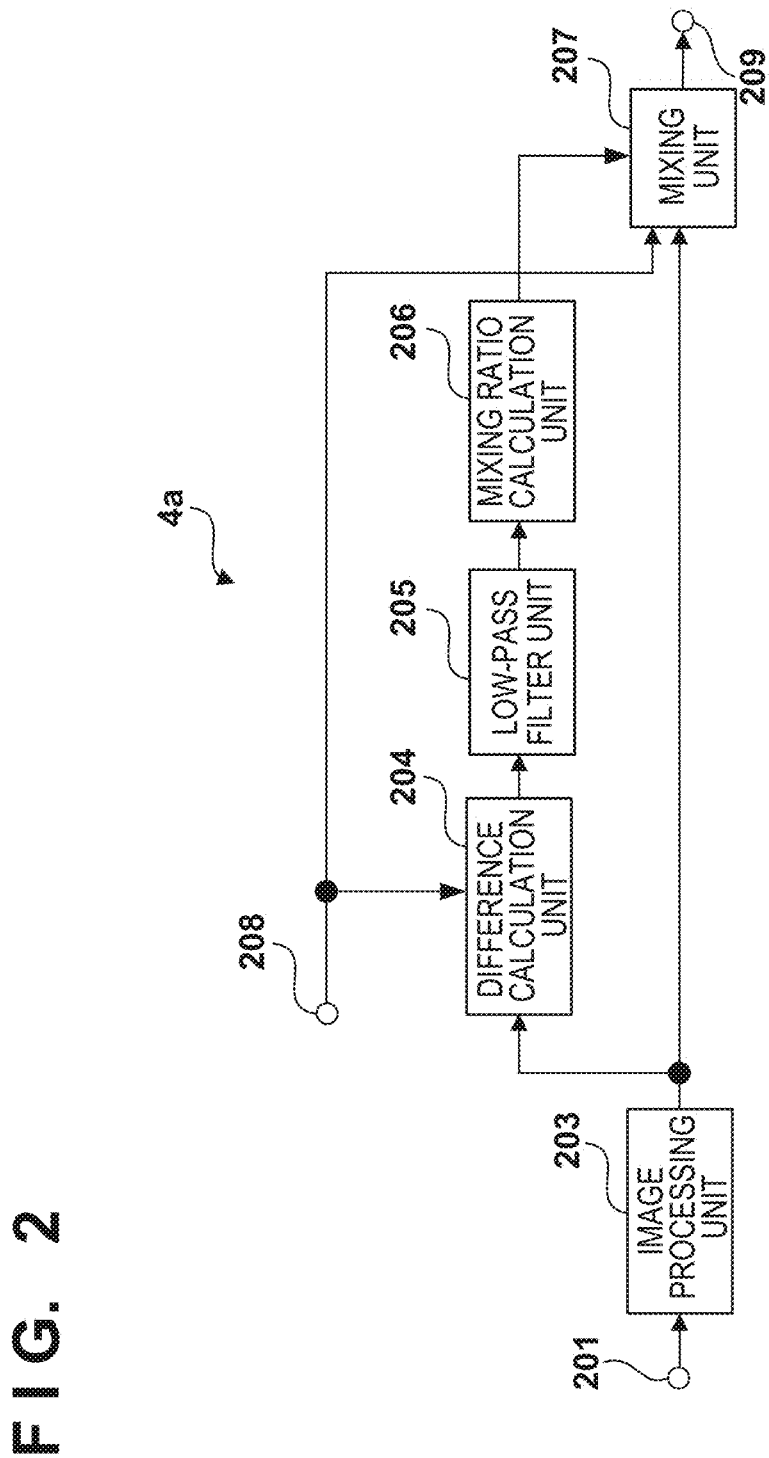
FIG. 2 is a block diagram illustrating a configuration of a signal processing unit 4a according to a first embodiment.

FIG. 2 is a block diagram illustrating a configuration of the signal processing unit 4a. The signal processing unit 4a includes an input terminal 201, an image processing unit 203, a difference calculation unit 204, a low-pass filter unit 205, a mixing ratio calculation unit 206, a mixing unit 207, an input terminal 208, and an output terminal 209. The digital image signals are input to the signal processing unit 4a via the input terminal 201. The image processing unit 203 subjects the digital image signals to a series of development processing such as pixel interpolation processing, luminance signal processing, and color signal processing. The difference calculation unit 204 calculates differential signals between a developed small-aperture image output from the image processing unit 203 and a developed main image input via the input terminal 208. The low-pass filter unit 205 performs filter processing to cut off or attenuate high-frequency components of the differential signals and allow low-frequency components to pass through. The mixing ratio calculation unit 206 detects, for each pixel, moire based on the differential signal subjected to the low-pass filter processing, and calculates a mixing ratio between the developed small-aperture image output from the image processing unit 203 and the developed main image input via the input terminal 208. The mixing unit 207 mixes, based on the mixing ratio, the signal level of the developed small-aperture image output from the image processing unit 203 and the signal level of the developed main image input via the input terminal 208, so as to supply the digital image signals in which moire is reduced (a moire-reduced image) to the output terminal 209.

Returning to FIG. 1, the image file processing unit 4b performs image file generation processing such as resizing processing or compression processing on the digital image signals, such as those of the moire-reduced image, that were output from the signal processing unit 4a, and stores the resultant signals in a recording medium 9.

In a storage unit 8, various types of information such as pixel pitch of the image sensor 2 is stored. The signal/file processing unit 4, the shooting condition determination unit 7, and a control unit 10 realize various types of functions based on the various types of information acquired by accessing the storage unit 8.

A display unit 5 performs predetermined processing for display on the moire-reduced image, and displays the processed image. Furthermore, the display unit 5 can also display the main image, the small-aperture image, and the like.

The control unit 10 controls the processing of the constituent components of the image capturing apparatus 100. For example, the control of the lens unit 1 by the lens unit control unit 6 is performed in accordance with an instruction of the control unit 10.

Details of Moire Reduction Processing

Figure 5:
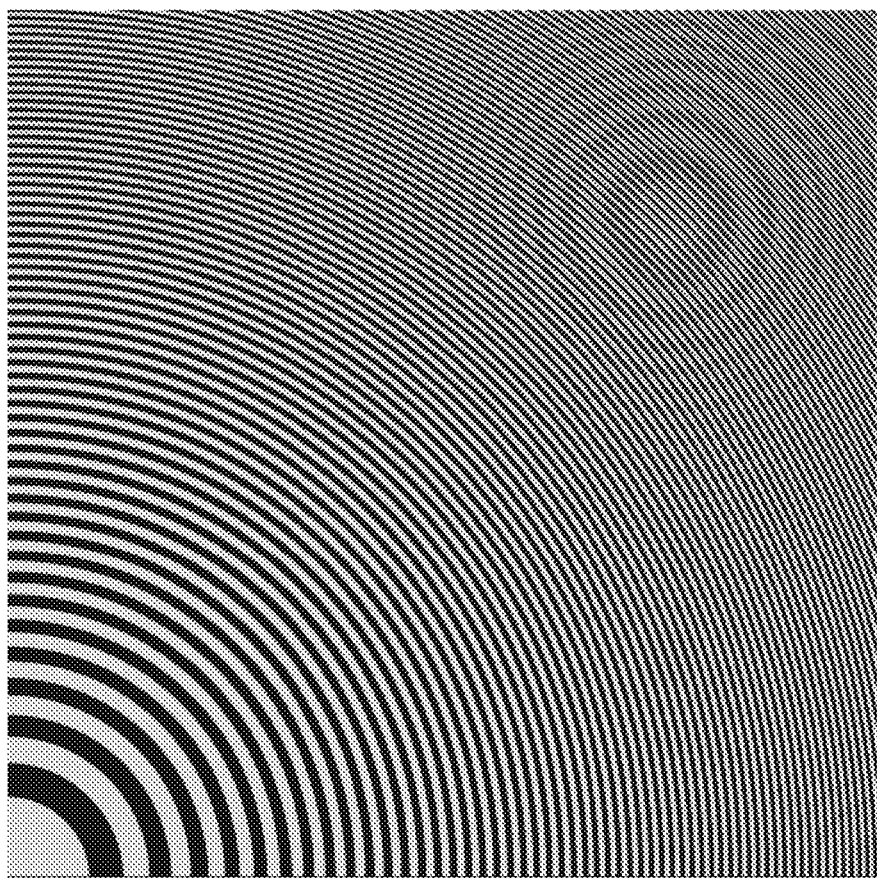
FIG. 5 is a diagram illustrating a CZP chart.

Hereinafter, the moire reduction processing that is executed by the image capturing apparatus 100 will be described in detail with reference to FIG. 3. In the present embodiment, a CZP chart that is ordinarily used for moire evaluation and resolution evaluation serves as a subject. FIG. 5 shows the CZP chart.

Figure 3:
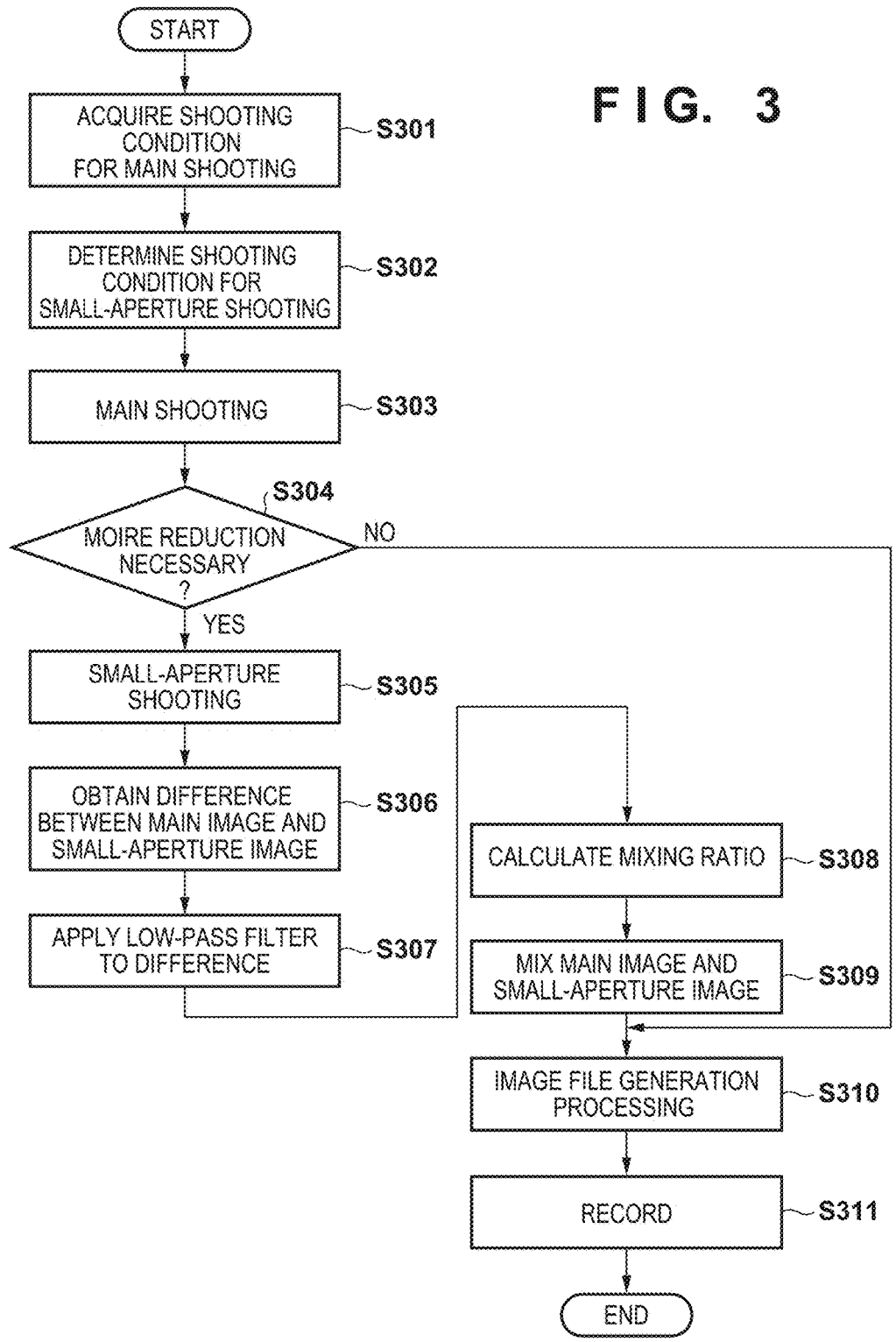
FIG. 3 is a flowchart of moire reduction processing.
Figure 4:
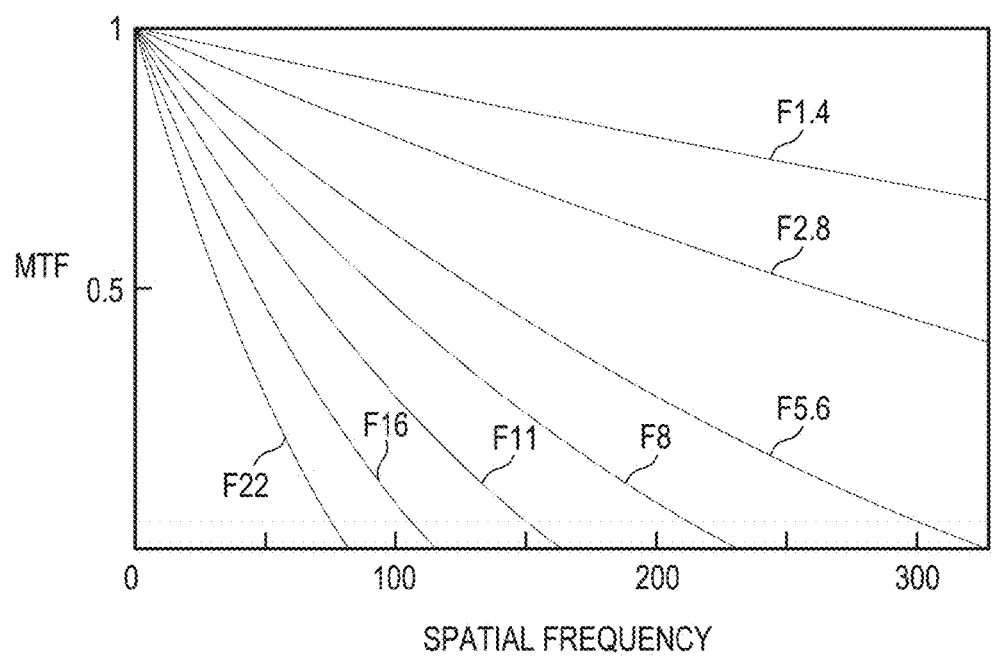
FIG. 4 is a diagram illustrating diffraction limit curves.

The procedure of the flowchart of FIG. 3 starts, for example, when a user operates an operation unit (not shown) to instruct the image capturing apparatus 100 to execute shooting. Unless otherwise noted, the processing of the steps shown in FIG. 3 is realized by the control unit 10 controlling the constituent components of the image capturing apparatus 100.

In step S301, the shooting condition determination unit 7 acquires shooting conditions for the main shooting (normal shooting conditions). As described above, the shooting conditions for the main shooting may be shooting conditions set manually by the user or shooting conditions automatically set by the image capturing apparatus 100 based on the scene or the like to be shot. Here, the shooting conditions for the main shooting are assumed to include the aperture value F5.6, the shutter speed 1/250 second, and the ISO sensitivity ISO 100, for example. Note that the present embodiment is not limited to the shooting conditions.

In step S302, the shooting condition determination unit 7 determines shooting conditions for the small-aperture shooting based on the shooting conditions for the main shooting. The shooting condition determination unit 7 determines, as the aperture value, a predetermined value for the small-aperture shooting (aperture value with which moire is expected to be reduced due to the influence of the diffraction phenomenon), and determines a shutter speed and an ISO sensitivity so that the same exposure as that under the shooting conditions for the main shooting acquired in step S301 can be achieved. Other shooting conditions (such as the focal length and the focus lens position) are assumed to have the same values as those of the shooting conditions for the main shooting. Here, it is assumed that the aperture value for the small-aperture shooting is F16. Furthermore, the shooting condition determination unit 7 reduces the shutter speed to 1/30 seconds so as to obtain the same exposure as that in the shooting conditions for the main shooting, and sets the ISO sensitivity to the same ISO 100 as that for the main shooting.

Note that the shooting conditions for the small-aperture shooting are not limited to the above-described examples, and the aperture value for the small-aperture shooting can be changed appropriately according to the amount of aberration of the image capturing optical system or the pixel pitch of the image sensor 2. For example, the aperture value for the small-aperture shooting may be the aperture value expressed by the following conditional expression (1).

$$F \geq a(p/\lambda) \quad (1)$$

where F is an F number (aperture value), p is a pixel pitch, and $\lambda$ is a predetermined wavelength included in the wavelength band of visible light. Alternatively, $\lambda$ may be set as the central wavelength of the wavelength band of light that can be received by the image sensor 2. "a" is a moire suppression coefficient. When a=1, the cutoff frequency as per diffraction that is determined based on the aperture value is equal to the sampling frequency N that is determined based on the pixel pitch of the image sensor 2. When a=2, the cutoff frequency as per diffraction is equal to N/2. For example, in the present embodiment, it is assumed that the pixel pitch p is 4.40 μm and $\lambda$ is 550 nm. In this case, when a=1, the aperture value is F8 but the contrast at the frequency N/2 remains at about 50%, and thus it is not possible to sufficiently reduce moire. On the other hand, when a=2, the aperture value is F16 and the contrast at the frequency band higher than N/2 is about 0%, and thus it is possible to sufficiently reduce moire.

Note that it is not essential that the aperture value for the small-aperture shooting is $a(p/\lambda)$ or greater. Even if the aperture value for the small-aperture shooting is smaller than $a(p/\lambda)$, to some extent the moire reducing effect can be expected, as long as the aperture value for the small-aperture shooting is greater than the aperture value for the main shooting.

In step S303, the control unit 10 performs the main shooting. At that time, in response to an instruction from the control unit 10, the shooting condition determination unit 7 transmits the aperture value F5.6, the shutter speed 1/250 seconds, and the focus lens position P of the shooting conditions for the main shooting acquired in step S301, to the lens unit control unit 6. Furthermore, the shooting condition determination unit 7 transmits the gain value that corresponds to the ISO 100 to the image sensor 2. The lens unit control unit 6 determines a charge accumulating time by driving the aperture 1a based on the aperture value F5.6 or driving a mechanical shutter at the shutter speed 1/250 seconds. Furthermore, the lens unit control unit 6 drives the focus lens 1b to a focal point by moving the focus lens 1b to the focus lens position P. In this state, shooting of the subject is performed. Note that, instead of the mechanical shutter, an electric shutter that controls the charge accumulating time of the image sensor 2 may be used for shutter speed control.

During the main shooting, a charge is accumulated on the image sensor 2 by the image light formed on the image capturing surface of the image sensor 2, and the accumulated charge is transferred in the vertical and horizontal directions, and is amplified with the gain value that corresponds to ISO 100. Thereafter, the A/D converter 3 performs the conversion of the accumulated charge into digital image signals. With the above-described procedure, the digital image signals that correspond to the main image are supplied to the signal processing unit 4a.

The signal processing unit 4a performs development processing on the main image. The image processing unit 203 performs a series of development processing, such as pixel interpolation processing, luminance signal processing, and color signal processing, on the main image that was input via the input terminal 201, and outputs the developed main image to the mixing unit 207. The mixing unit 207 supplies the developed main image as is to the output terminal 209.

In step S304, the control unit 10 determines whether or not moire reduction processing is necessary. For example, if the aperture value for the main shooting is smaller than the above-described aperture value (F16) for the small-aperture shooting, the likelihood of moire occurring in the main image is high. Accordingly, the control unit 10 determines that the moire reduction processing needs to be performed. In this case, the control unit 10 performs control for storing the main image output from the output terminal 209 in the storage unit 8, and advances the procedure to step S305. If the moire reduction processing does not need to be performed, the control unit 10 advances the procedure to step S310.

Figure 6:
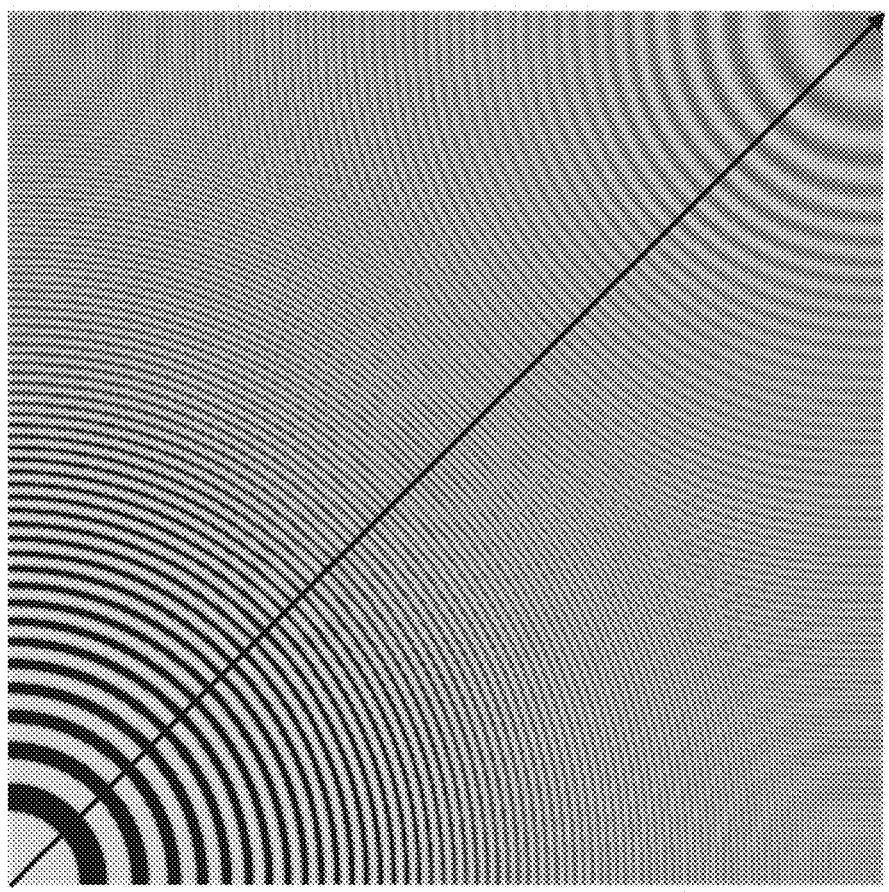
FIG. 6 is a diagram illustrating an example of a main image.
Figure 7:
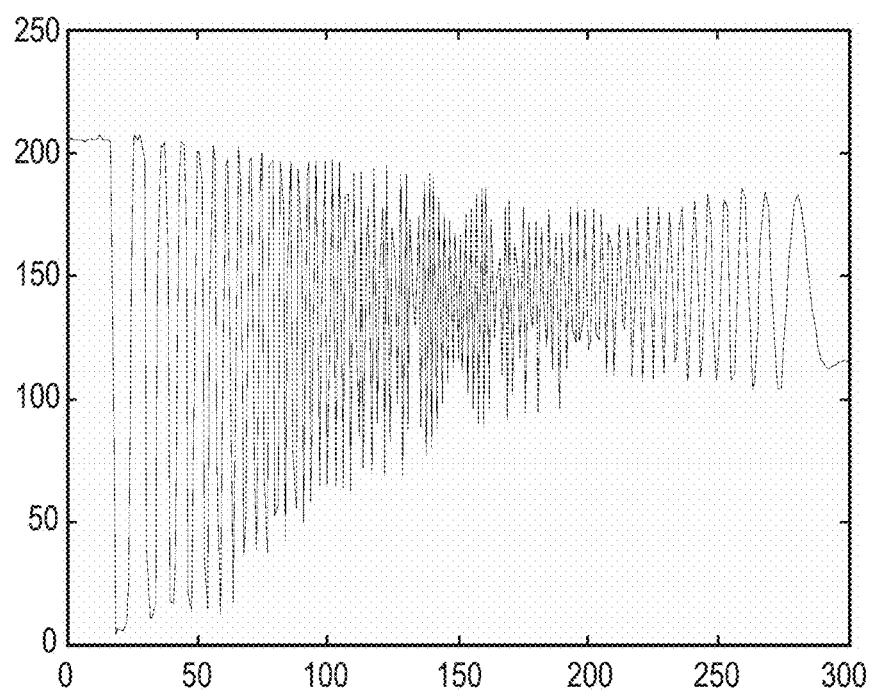
FIG. 7 is a diagram illustrating a line profile of the main image of FIG. 6.

Here, FIG. 6 shows a main image obtained by performing the main shooting with respect to the CZP chart (FIG. 5), which serves as a subject. Furthermore, FIG. 7 shows a line profile of the line of the main image of FIG. 6 that is drawn from the lower left to the upper right of the screen. As is understandable from FIGS. 6 and 7, the moire that is not present in the subject (FIG. 5) is generated in the high-frequency region in the upper right portion of the screen, and the image quality has deteriorated.

In step S305, the control unit 10 performs the small-aperture shooting. At this time, in response to an instruction from the control unit 10, the shooting condition determination unit 7 transmits the aperture value F16, the shutter speed 1/30 seconds, and the focus lens position P of the shooting conditions for the small-aperture shooting determined in step S302, to the lens unit control unit 6. Furthermore, the shooting condition determination unit 7 transmits the gain value that corresponds to ISO 100 to the image sensor 2. The lens unit control unit 6 determines a charge accumulating time by driving the aperture 1a based on the aperture value F16 or driving the mechanical shutter at the shutter speed 1/30 seconds. Furthermore, the lens unit control unit 6 drives the focus lens 1b to the focal point by moving the focus lens 1b to the focus lens position P. In this state, shooting of the subject is performed. Thereafter, a small-aperture image is generated by the same procedure as that of the main shooting in step S303, and is supplied as digital image signals to the signal processing unit 4a.

The signal processing unit 4a performs development processing on the small-aperture image. The image processing unit 203 performs a series of development processes, such as pixel interpolation processing, luminance signal processing, and color signal processing, on the small-aperture image that was input via the input terminal 201, and outputs the developed small-aperture image to the difference calculation unit 204 and the mixing unit 207.

In step S306, the difference calculation unit 204 calculates, for each area including one or more pixels, a differential signal, which is a difference in the signal level, between the developed main image read from the storage unit 8 and the developed small-aperture image output from the image processing unit 203. This area may be set in units of a pixel or in units of pixel groups each constituted by at least two pixels. Even in the case of pixel group units, a differential signal of a pixel group to which pixels belong is calculated as a differential signal for each pixel, and thus, as a result, a differential signal for each pixel is calculated. Note that the developed main image is input to the signal processing unit 4a from the storage unit 8 via the input terminal 208.

In the small-aperture shooting according to the present embodiment, the contrast at the frequency higher than N/2 is attenuated to about 0% due to the diffraction phenomenon, and thus the likelihood of moire occurring in the small-aperture image is low regardless of the subject to be shoot.

Figure 8:
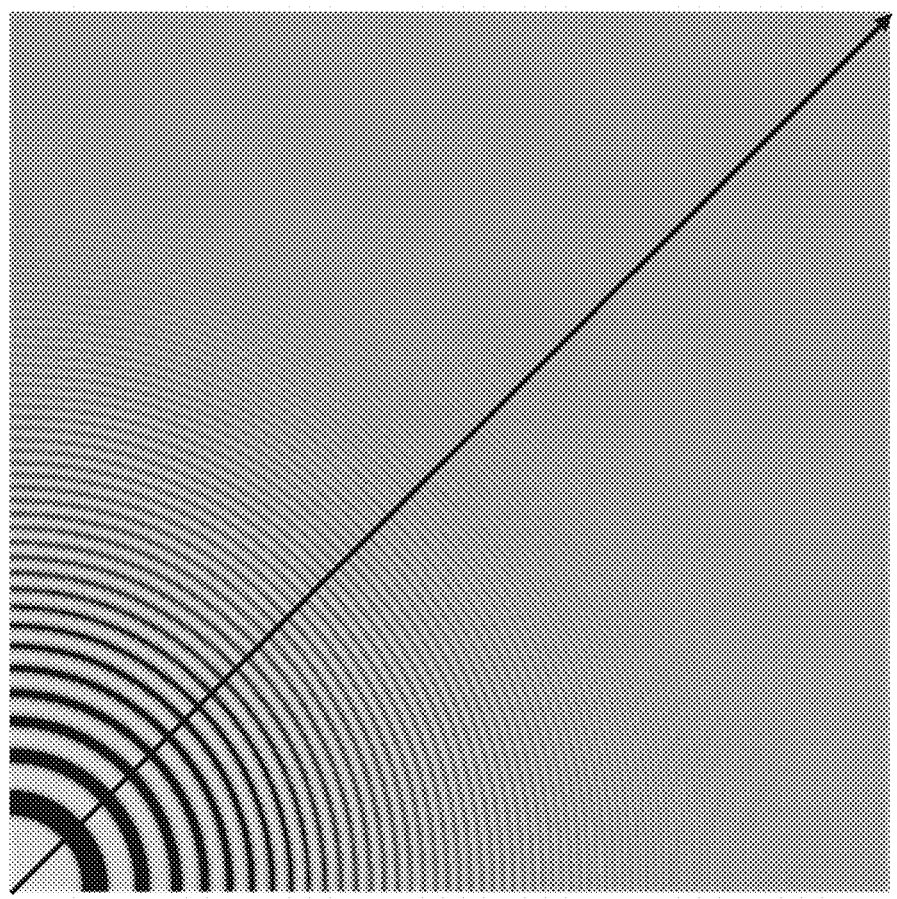
FIG. 8 is a diagram illustrating an example of a small-aperture image.
Figure 9:
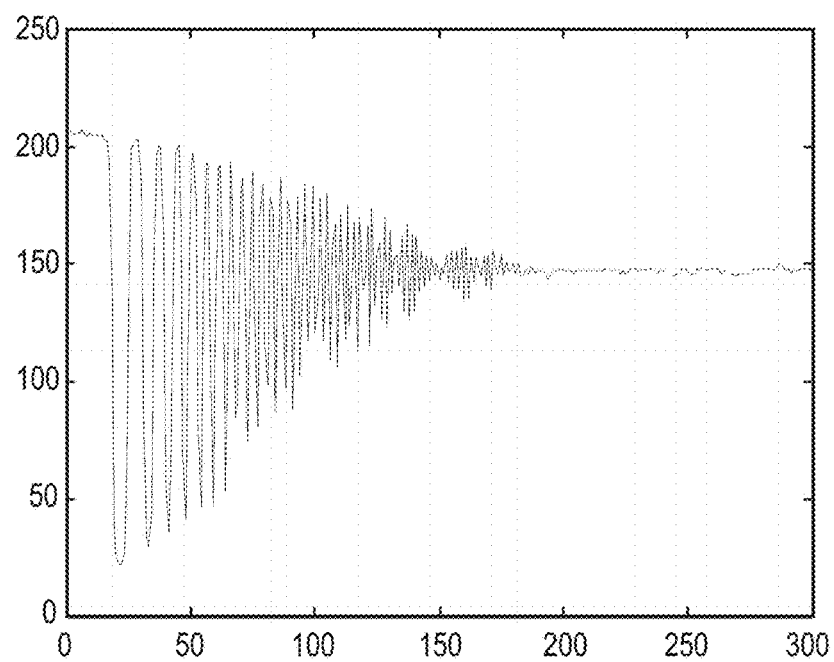
FIG. 9 is a diagram illustrating a line profile of the small-aperture image of FIG. 8.

Here, FIG. 8 shows a small-aperture image obtained by performing the small-aperture shooting with respect to the CZP chart (FIG. 5), which serves as a subject. Furthermore, FIG. 9 shows a line profile of the line of the small-aperture image of FIG. 8 that is drawn from the lower left to the upper right of the screen. As is understandable from FIGS. 8 and 9, the moire that is present in the main image (FIG. 6) is no longer present in the high-frequency region in the upper right portion of the screen. Therefore, it is considered that the region having a large difference between the main image and the small-aperture image is such that moire is likely to occur in the main image.

Figure 10:
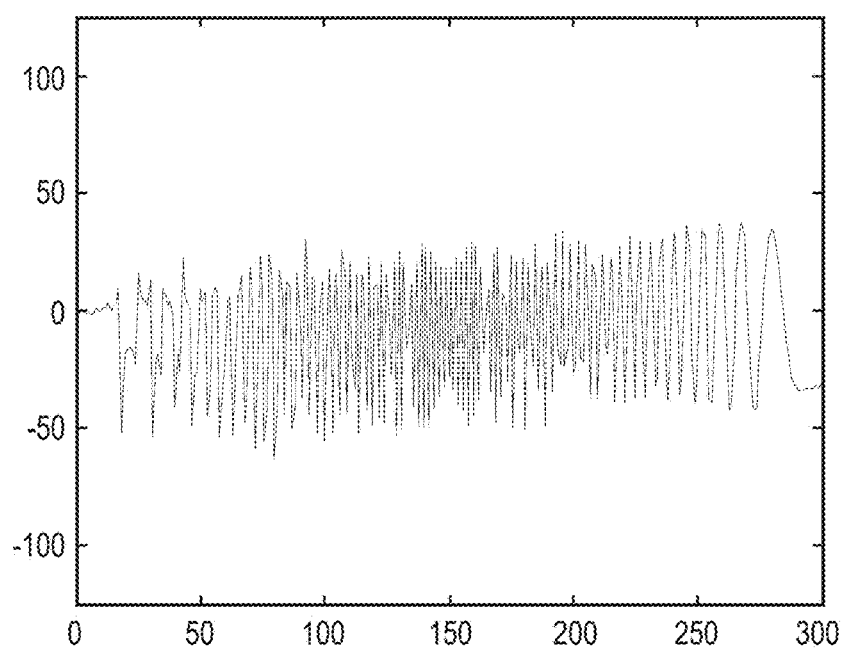
FIG. 10 is a diagram illustrating a line profile of differential signals according to the first embodiment (before low-pass filter processing).

The differential signals according to the present embodiment are, for example, values obtained by subtracting values of the small-aperture image from values of the main image for the planes G, R-g, and B-g. FIG. 10 shows the line profile of the differential signals. Note that the present embodiment is not limited to this, and for example, a YUV format may be used and differential signals obtained for the respective planes of YUV may be used.

In step S307, the low-pass filter unit 205 performs low-pass filter processing on the differential signals output from the difference calculation unit 204. The low-pass filter unit 205 reads out, and uses a filter stored in the storage unit 8. The diffraction phenomenon attenuates not only moire but also the contrast of the subject. Accordingly, if, as shown in FIGS. 8 and 9, the subject of the small-aperture image of the present embodiment has a region with a high frequency band around N/2, the contrast of this region will be reduced to about 0%. Accordingly, as shown in FIG. 10, it is difficult to use the contrast of the differential signals between the main image and the small-aperture image to distinguish moire from the subject having the high frequency band. On the other hand, because the attenuation of the contrast at the frequency lower than, for example, N/4 is small, it is easy to distinguish the moire folded to a low frequency band from the subject having a low frequency band. Accordingly, in the present embodiment, a two-dimensional Gaussian filter with a filter coefficient of 14641 is applied to the differential signals.

Figure 11:
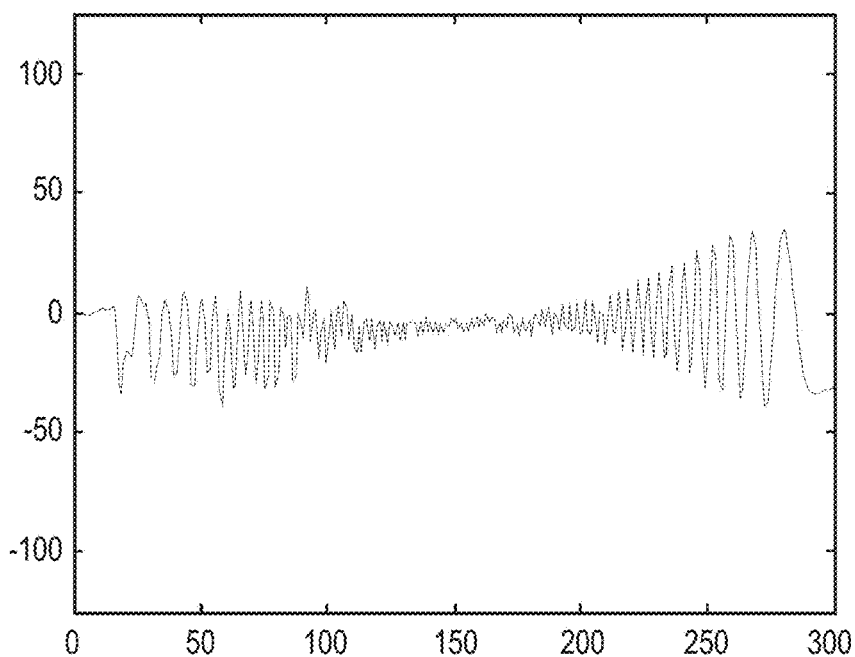
FIG. 11 is a diagram illustrating a line profile of differential signals according to the first embodiment (after the low-pass filter processing).

FIG. 11 shows a line profile of differential signals to which the Gaussian filter has been applied. Since only the contrast of the moire folded to the low frequency band largely remains, it is possible to correctly detect moire.

Note that the present embodiment is not limited to the Gaussian filter, and a suitable filter may be selected according to the frequency band of the moire to be detected, the frequency band of a subject, and the format of an input signal, or the like. Furthermore, the low-pass filter processing is not essential.

In step S308, the mixing ratio calculation unit 206 calculates the mixing ratio $\alpha$ of the small-aperture image relative to the main image based on the magnitude of each differential signal d output from the low-pass filter unit 205. In the present embodiment, it is assumed that the differential signals d are of 8 bits, and when the differential signals d are 0, 10, 20, and 30, the mixing ratios $\alpha$ are respectively indicated by $\alpha_0$, $\alpha_{10}$, $\alpha_{20}$, and $\alpha_{30}$. Furthermore, when the differential signal d has a value other than the above-described values, the mixing ratio $\alpha$ is calculated by linear interpolation of neighborhood values.

For example, if importance is given to moire reduction, the mixing ratios $\alpha$ are set as follows.

$\alpha_0=0$
$\alpha_{10}=0.5$
$\alpha_{20}=1$
$\alpha_{30}=1$

Figure 12:
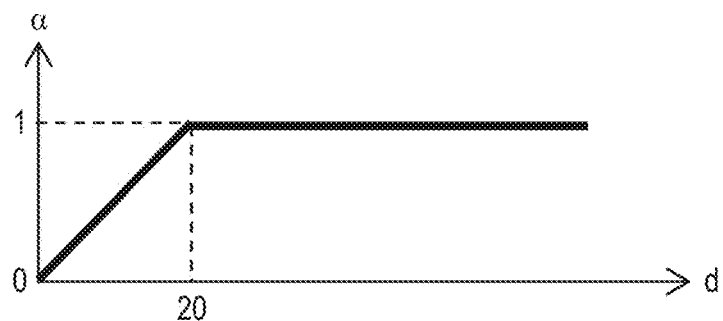
FIG. 12 is a graph showing a relationship between a differential signal d and a mixing ratio α (when importance is given to moire reduction).

FIG. 12 shows a graph illustrating the relationship between the differential signal d and the mixing ratio $\alpha$ at this time. The mixing ratio calculation unit 206 calculates the value of the mixing ratio $\alpha$ with respect to the differential signal d based on the graph of FIG. 12.

Note that the present embodiment is not limited to the graph of FIG. 12, and it is possible to adjust the balance between the degree of moire reduction and the retention of the resolution of the main image by changing the relationship between the differential signal d and the mixing ratio $\alpha$. For example, if importance is given to retention of the resolution of the main image, the mixing ratios $\alpha$ are set as follows.

$\alpha_0=0$
$\alpha_{10}=0$
$\alpha_{20}=0.5$
$\alpha_{30}=1$

Figure 13:
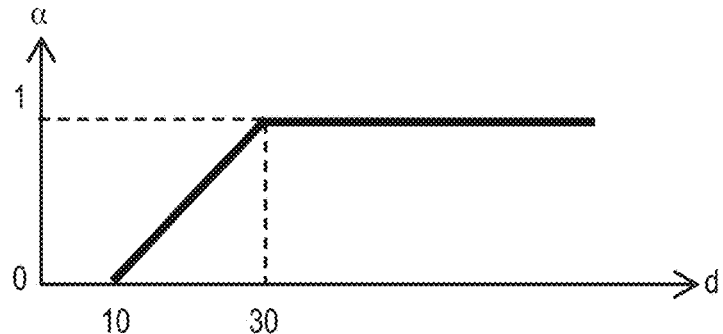
FIG. 13 is a graph showing a relationship between the differential signal d and the mixing ratio α (when importance is given to resolution retention).

FIG. 13 shows a graph illustrating the relationship between the differential signal d and the mixing ratio $\alpha$ at this time. If the mixing ratio $\alpha$ is calculated based on the graph of FIG. 13, in the region having a small difference, the small-aperture image will not be mixed with the main image. Accordingly, moire is not reduced, and the resolution is also not reduced.

In the present embodiment, it is assumed that the mixing ratio calculation unit 206 obtains the mixing ratios αG, αRG, and αBG for dG, dRG, and dBG, respectively, which are differential signals for the respective planes G, R−g, and B−g. At this time, a different relationship between the differential signal d and the mixing ratio α may also be defined for each plane. For example, by always setting the value of αG with respect to G to 0 regardless of the value of dG, it is possible to give priority to retention of the resolution of a luminance signal without reducing moire of the luminance signal. Furthermore, by calculating the values of αRG and αBG with respect to dRG and dBG based on the graph of FIG. 12, it is possible to give priority to reduction of color moire rather than the retention of the minute color resolution. Note that the present embodiment is not limited to this.

In step S309, the mixing unit 207 mixes the signal levels of the developed main image input from the storage unit 8 via the input terminal 208 and the signal levels of the developed small-aperture image output from the image processing unit 203, based on the mixing ratios output from the mixing ratio calculation unit 206. In the present embodiment, the mixing unit 207 mixes the signal levels of the main image and the signal levels of the small-aperture image based on, for example, following Formulae (2) to (4), and generates an output image. The generated output image is output to the image file processing unit 4b via the output terminal 209.

$$\text{Intermediate image 1} = (\text{main image} \times (1-\alpha G)) + (\text{small-aperture image} \times \alpha G) \tag{2}$$

$$\text{Intermediate image 2} = (\text{intermediate image 1} \times (1-\alpha RG)) + (\text{small-aperture image} \times \alpha RG) \tag{3}$$

$$\text{Output image} = (\text{intermediate image 2} \times (1-\alpha BG)) + (\text{small-aperture image} \times \alpha BG) \tag{4}$$

In the present embodiment, RGB format images are used for the main image and the small-aperture image, and Formulae (2) to (4) are applied to all of the RGB planes, and thus it is possible to reduce luminance moire and color moire in a balanced manner.

Figure 14:
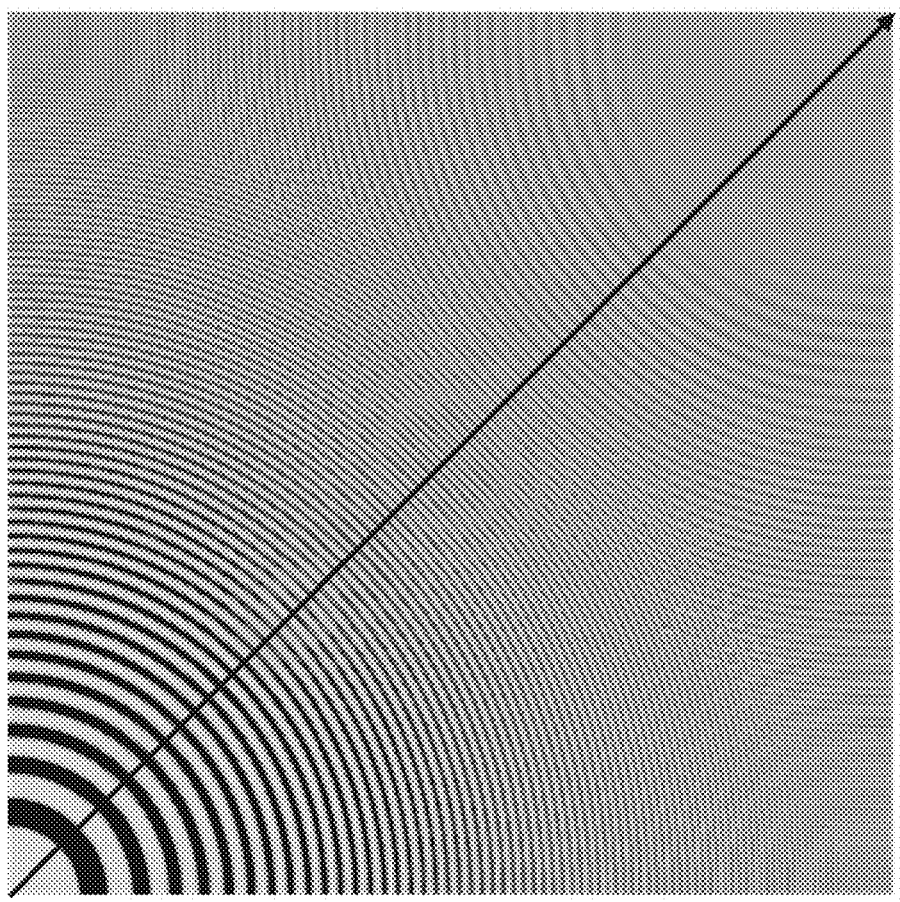
FIG. 14 is a diagram illustrating an output image (moire-reduced image) obtained by mixing the main image of FIG. 6 and the small-aperture image of FIG. 8.
Figure 15:
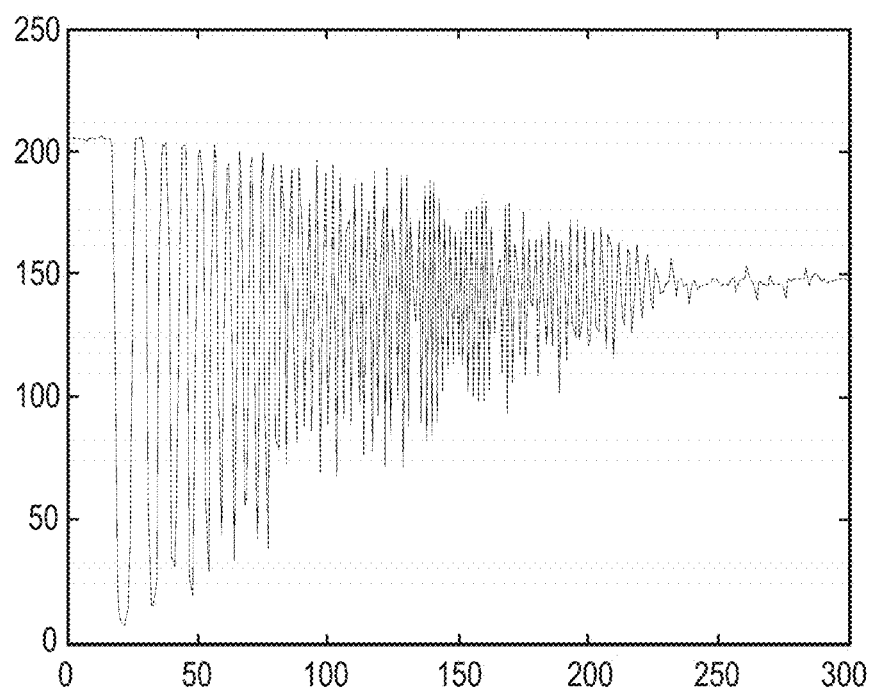
FIG. 15 is a diagram illustrating a line profile of the output image (moire-reduced image) of FIG. 14.

FIG. 14 shows an output image obtained by mixing the signal levels of the main image of FIG. 6 and the signal levels of the small-aperture image of FIG. 8. The output image of FIG. 14 is an image that is obtained by calculating αG, αRG, and αBG for dG, dRG, and dBG respectively based on the graph of FIG. 12, and mixing the signal levels of the main image with the signal levels of the small-aperture image based on Formulae (2) to (4). As is understandable from FIG. 12 and Formulae (2) to (4), mixing the signal levels of the main image with the signal levels of the small-aperture image is performed such that the larger a pixel is for the corresponding differential signal, the larger the signal level ratio is for the small-aperture image. Furthermore, FIG. 15 shows a line profile of the line of the output image of FIG. 14 that is drawn from the lower left to the upper right of the screen. As is understandable from the comparison with the main image, in the output image, the moire is reduced in the upper right portion of the screen, while a reduction in the resolution of the subject is suppressed in a portion from the lower left to the center of the screen.

Note that the present embodiment is not limited to this, and it is also possible to reduce only color moire without affecting luminance signals, by inputting, for example, YUV format images and applying Formulae (2) to (4) only to UV signals.

Furthermore, the mixing unit 207 may mix the signal levels of the main image with the signal levels of the small-aperture image based on following Formulae (5) to (8), instead of Formulae (2) to (4).

$$\text{Intermediate image 1} = (\text{main image} \times (1-\alpha G)) + (\text{small-aperture image} \times \alpha G) \tag{5}$$

$$\text{Intermediate image 2} = (\text{main image} \times (1-\alpha RG)) + (\text{small-aperture image} \times \alpha RG) \tag{6}$$

$$\text{Intermediate image 3} = (\text{main image} \times (1-\alpha BG)) + (\text{small-aperture image} \times \alpha BG) \tag{7}$$

$$\text{Output image} = (\text{Intermediate image 1} + \text{intermediate image 2} + \text{intermediate image 3})/3 \tag{8}$$

When Formulae (5) to (8) are used, the moire reduction effect is reduced compared to the case where Formulae (2) to (4) are used, but a reduction in resolution is suppressed.

In step S310 that follows step S309, the image file processing unit 4b performs image file generation processing using a predetermined format on the moire-reduced image that was generated by the mixing unit 207 and output from the output terminal 209. In step S311, the image file processing unit 4b stores the image file of the moire-reduced image in the recording medium 9.

On the other hand, when the procedure moves from step S304 to step S310, the image file processing unit 4b performs, in step S310, image file generation processing using a predetermined format on the main image output from the output terminal 209 in step S303. Then, in step S311, the image file processing unit 4b stores an image file of the main image in the recording medium 9. In other words, if the aperture value for the main shooting is greater than or equal to the aperture value for the small-aperture shooting (greater than or equal to a predetermined value), the likelihood of moire occurring in the main image is low, and thus the image capturing apparatus 100 neither captures a small-aperture image nor performs moire reduction processing.

Note that even if a blurred image or a filter image (instead of the small-aperture image) is generated as an image to be mixed with the main image, the determination processing in step S304 may be performed based on whether or not the aperture value for the main shooting is smaller than the aperture value for the small-aperture shooting (smaller than a predetermined value). This is because it is conceivable that, regardless of the type of the image to be mixed with the main image, the likelihood of moire occurring is low in the main image if the aperture value for the main shooting is smaller than the aperture value for the small-aperture shooting.

Furthermore, although in FIG. 3, the main shooting is performed in step S303 and then the small-aperture shooting is performed in step S305, the order of the main shooting and the small-aperture shooting may be reversed.

As described above, according to the first embodiment, the image capturing apparatus 100 mixes the main image with the small-aperture image using the mixing ratio based on a difference corresponding to each pixel. Accordingly, it is possible to reduce moire while suppressing a reduction in resolution.

Note that the moire reduction processing of the present embodiment may also be executed by an image processing apparatus different from the image capturing apparatus 100. In this case, the image processing apparatus acquires a main image and a small-aperture image from an external apparatus such as the image capturing apparatus 100, and mixes the acquired main image and small-aperture image based on differences. Furthermore, if the aperture value for the main image is greater than or equal to the aperture value for the small-aperture image (greater than or equal to a predetermined value), the image processing apparatus does not have to perform the mixing (that is, the image processing apparatus does not need to generate a moire-reduced image).

Second Embodiment

A second embodiment describes a configuration in which moire reduction processing is performed together with correction (diffraction correction) of diffraction blur (image degradation caused by diffraction at the aperture 1a). In the present embodiment, the image capturing apparatus 100 has a similar configuration as that of the first embodiment (see FIG. 1) except for the configuration of the signal processing unit 4a. Hereinafter, a description will be given with a focus on differences from the first embodiment.

Figure 16:
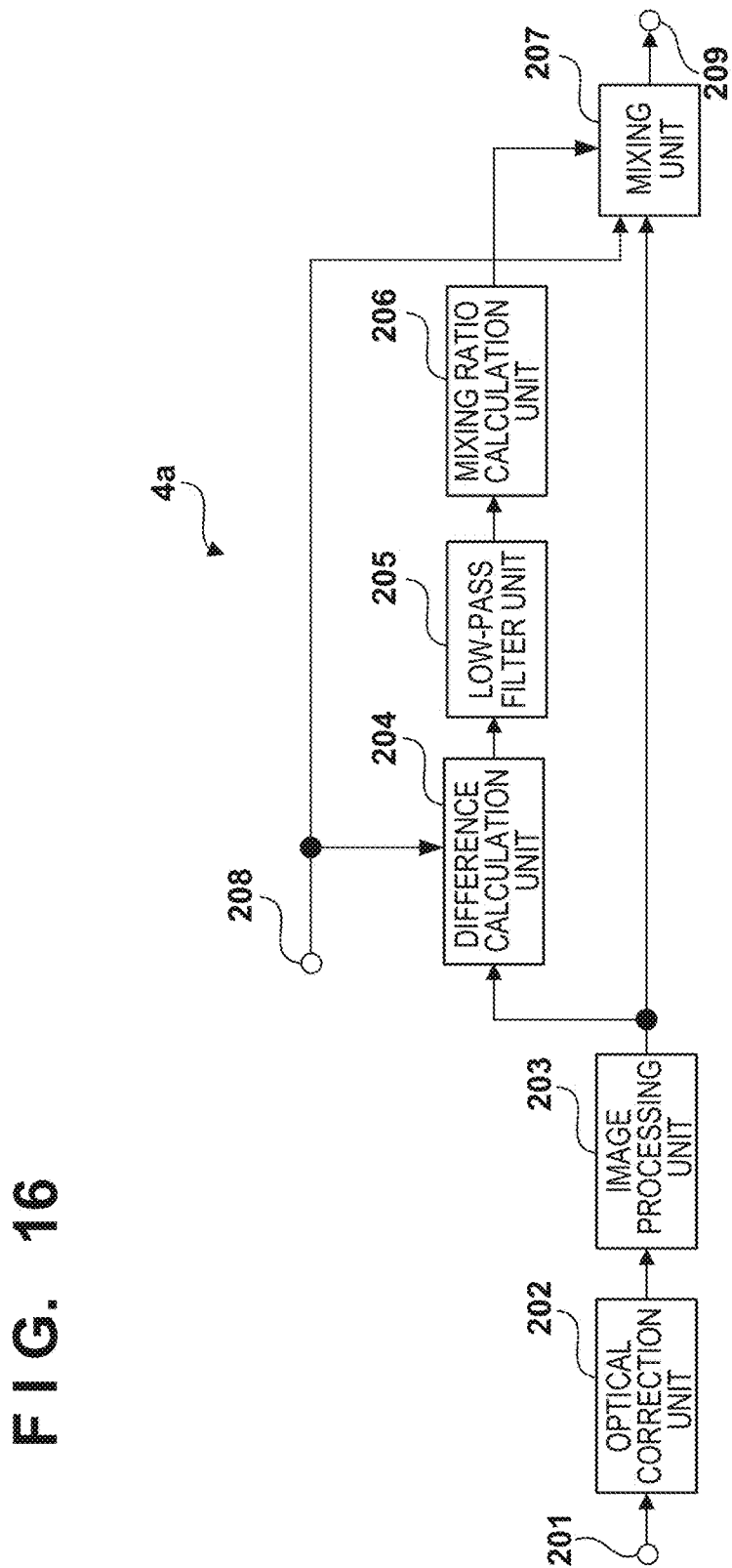
FIG. 16 is a block diagram illustrating a configuration of a signal processing unit 4a according to a second embodiment.

FIG. 16 is a block diagram illustrating a configuration of a signal processing unit 4a according to the second embodiment. In FIG. 16, the same reference numerals are given to the same or similar constituent components as those of FIG. 2. The signal processing unit 4a of the present embodiment is further provided with an optical correction unit 202 in front of the image processing unit 203. The optical correction unit 202 performs diffraction correction on the digital image signals input via the input terminal 201, and corrects image degradation due to the optical characteristics of the image capturing optical system. Any suitable known technique such as correction using an image recovery filter disclosed in, for example, Japanese Patent Laid-Open No. 2013-051524 (particularly, Paragraphs 0002 to 0013) may be used for the diffraction correction.

The moire reduction processing of the present embodiment is similar to that of the first embodiment except for the small-aperture shooting in step S305 of FIG. 3. Note that correction by the optical correction unit 202 is not performed in the main shooting of step S303.

In S305, the optical correction unit 202 performs diffraction correction on the undeveloped small-aperture image using an image recovery filter. For example, the optical correction unit 202 performs diffraction correction by acquiring, from the storage unit 8, an image recovery filter that corresponds to the aperture value for the small-aperture shooting, and applying the image recovery filter to the small-aperture image. Note that the present embodiment is not limited to this, and for example, edge enhancement processing using an unsharp mask or the like may be performed as the diffraction correction. The processing thereafter (such as low-pass filter processing by the low-pass filter unit 205) is similar to that of the first embodiment.

By subjecting the small-aperture image to the diffraction correction, the contrast of the subject is improved to approach the contrast of the main image, and differential signals of the subject region decrease. On the other hand, because the contrast at the frequency band higher than N/2 in which moire occurs is attenuated to about 0% by the diffraction phenomenon at the time of small-aperture shooting, the diffraction correction does not contribute to an improvement, and the differential signals in the moire region remain large without changing. Accordingly, by subjecting the small-aperture image to the diffraction correction, it is easy to distinguish the moire region from the subject region in differential signals.

Figure 17:
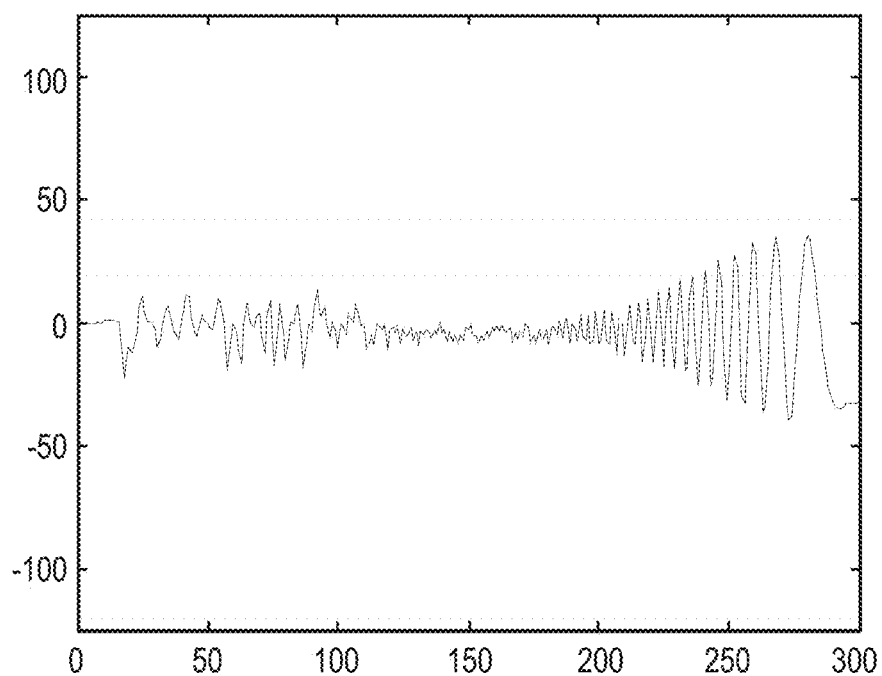
FIG. 17 is a diagram illustrating a line profile of differential signals according to the second embodiment (after low-pass filter processing).

FIG. 17 shows a line profile of differential signals between a main image and a small-aperture image that is subjected to the diffraction correction. A difference in the contrast between the moire region and the subject region is large compared to the differential signals of FIG. 11 (in which no diffraction correction is performed), and thus more efficient moire reduction can be expected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-130326, filed Jun. 29, 2015 which is hereby incorporated by reference herein in its entirety.

What is claimed is:

1. An image processing apparatus comprising a processor and a memory, wherein the processor is configured to:
   calculate a difference in a signal level, for an area of interest including one or more pixels, between a first image obtained by shooting a subject under a first shooting condition and a second image obtained by shooting the subject under a second shooting condition in which high-frequency components of an optical image of the subject are reduced compared to the first shooting condition; and
   mix a signal level of the first image and a signal level of the second image at a mixing ratio based on the difference, so as to generate a third image,
   wherein the processor sets the mixing ratio such that a ratio of the second image to the first image when the difference is a first value is larger than a ratio of the second image to the first image when the difference is a second value that is smaller than the first value.

2. The image processing apparatus according to claim 1, wherein the processor applies low-pass filter processing to the difference, and
wherein the processor sets the mixing ratio based on the difference to which the low-pass filter processing is applied.

3. The image processing apparatus according to claim 1, wherein the processor determines whether or not an aperture value of the first shooting condition is smaller than a predetermined value, and
wherein the processor does not generate the third image if the aperture value of the first shooting condition is greater than or equal to the predetermined value.

4. The image processing apparatus according to claim 3, wherein the predetermined value is $2\times(p/\lambda)$, where p is a pixel pitch of an image sensor for use in the shooting, and $\lambda$ is a predetermined wavelength included in a wavelength band of visible light.

5. The image processing apparatus according to claim 3, wherein the second shooting condition is a shooting condition in which the aperture value is greater than or equal to the predetermined value.

6. The image processing apparatus according to claim 1, wherein the second shooting condition is a shooting condition in which the aperture value is greater than that of the first shooting condition.

7. The image processing apparatus according to claim 6, wherein the processor corrects image degradation of the second image that is caused by diffraction at an aperture, and
wherein the processor calculates the difference based on the second image corrected by the processor.

8. The image processing apparatus according to claim 1, wherein the second shooting condition is a shooting condition in which an optical low-pass filter is arranged on a light path leading to an image sensor for use in the shooting, and
wherein the first shooting condition is a shooting condition in which the optical low-pass filter is not arranged on the light path.

9. The image processing apparatus according to claim 1, wherein the first shooting condition is a shooting condition in which the subject is in focus, and
wherein the second shooting condition is a shooting condition in which the subject is not in focus.

10. An image capturing apparatus comprising a processor and a memory, wherein the processor is configured to:
control generation of a first image by controlling shooting a subject under a first shooting condition, and control generation of a second image by controlling shooting the subject under a second shooting condition in which high-frequency components of an optical image of the subject are reduced compared to the first shooting condition;
calculate a difference in a signal level, for an area of interest including one or more pixels, between the first image and the second image; and
mix a signal level of the first image and a signal level of the second image at a mixing ratio based on the difference, so as to generate a third image,
wherein the processor sets the mixing ratio such that a ratio of the second image to the first image when the difference is a first value is larger than a ratio of the second image to the first image when the difference is a second value that is smaller than the first value.

11. An image processing method executed by an image processing apparatus, the image processing method comprising:
calculating a difference in a signal level, for an area of interest including one or more pixels, between a first image obtained by shooting a subject under a first shooting condition and a second image obtained by shooting the subject under a second shooting condition in which high-frequency components of an optical image of the subject are reduced compared to the first shooting condition; and
mixing a signal level of the first image and a signal level of the second image at a mixing ratio based on the difference, so as to generate a third image,
wherein the mixing sets the mixing ratio such that a ratio of the second image to the first image when the difference is a first value is larger than a ratio of the second image to the first image when the difference is a second value that is smaller than the first value.

12. An image capturing method executed by an image capturing apparatus, the image capturing method comprising:
generating a first image by shooting a subject under a first shooting condition, and generating a second image by shooting the subject under a second shooting condition in which high-frequency components of an optical image of the subject are reduced compared to the first shooting condition;
calculating a difference in a signal level, for an area of interest including one or more pixels, between the first image and the second image; and
mixing a signal level of the first image and a signal level of the second image at a mixing ratio based on the difference, so as to generate a third image,
wherein the mixing sets the mixing ratio such that a ratio of the second image to the first image when the difference is a first value is larger than a ratio of the second image to the first image when the difference is a second value that is smaller than the first value.

13. A non-transitory computer-readable storage medium which stores a program for causing a computer to execute an image processing method comprising:
calculating a difference in a signal level, for an area of interest including one or more pixels, between a first image obtained by shooting a subject under a first shooting condition and a second image obtained by shooting the subject under a second shooting condition in which high-frequency components of an optical image of the subject are reduced compared to the first shooting condition; and
mixing a signal level of the first image and a signal level of the second image at a mixing ratio based on the difference, so as to generate a third image,
wherein the mixing sets the mixing ratio such that a ratio of the second image to the first image when the difference is a first value is larger than a ratio of the second image to the first image when the difference is a second value that is smaller than the first value.

14. A non-transitory computer-readable storage medium which stores a program for causing a computer to execute an image capturing method comprising:
generating a first image by shooting a subject under a first shooting condition, and generating a second image by shooting the subject under a second shooting condition in which high-frequency components of an optical image of the subject are reduced compared to the first shooting condition;

calculating a difference in a signal level, for an area of interest including one or more pixels, between the first image and the second image; and mixing a signal level of the first image and a signal level of the second image at a mixing ratio based on the difference, so as to generate a third image, wherein the mixing sets the mixing ratio such that a ratio of the second image to the first image when the difference is a first value is larger than a ratio of the second image to the first image when the difference is a second value that is smaller than the first value.

\* \* \* \* \*